United States Patent [19]

Cafarelli et al.

[11] Patent Number: 4,811,022

[45] Date of Patent: Mar. 7, 1989

[54] SCANNING ANTENNA HAVING PHASE CENTER DIVERSITY

[76] Inventors: Nicholas J. Cafarelli, 60-Audubon St., Springfield, Mass. 01108; Glen D. Adams, 4603 Marble Rock Ct., Chantilly, Va. 22421

[21] Appl. No.: 925,166

[22] Filed: Oct. 31, 1986

[51] Int. Cl.⁴ .............................................. G01S 1/08
[52] U.S. Cl. .................................. 342/407; 342/411; 342/374
[58] Field of Search ............... 342/407, 408, 409, 411, 342/385–387, 371, 374

[56] References Cited

U.S. PATENT DOCUMENTS

| | | | |
|---|---|---|---|
| 3,409,890 | 11/1968 | Redlich | 342/407 |
| 3,716,863 | 2/1973 | Ghose et al. | 342/374 |
| 3,922,685 | 11/1975 | Opas | 342/374 |
| 4,017,862 | 4/1977 | Wild | 342/408 |
| 4,306,239 | 12/1981 | Enein | 342/408 |
| 4,387,378 | 6/1983 | Henderson | 342/374 |
| 4,484,196 | 11/1984 | Lucas et al. | 342/404 |
| 4,489,326 | 12/1984 | Studenny | 342/408 |
| 4,670,756 | 6/1987 | Lopez | 342/408 |

Primary Examiner—Theodore M. Blum
Assistant Examiner—David Cain
Attorney, Agent, or Firm—Nicholas J. Cafarelli

[57] ABSTRACT

The object of this invention is to reduce the adverse effects of reflected electromagnetic radiation on the measurement threshold of a scanning beam. It has particular application to the time reference scanning beam of the international microwave landing system (MLS). In the present MLS configuration, the reflection induced errors during the "TO" scan are additive to those of the "FRO" scan. This invention describes a method and apparatus for compensating errors by reversing the phase of the reflections during the "FRO" scan, by displacing the phase center of the transmit antenna during that scan. System performance is enhanced by the errors compensation.

12 Claims, 3 Drawing Sheets

SCANNING ANTENNA HAVING PHASE CENTER DIVERSITY

DESCRIPTION

1. Technical Field

This invention relates to electromagnetic radiation by scanning beam antennas, and in particular to a technique for reducing the effects of radiation reflections that add vectorially to the direct path radiation.

2. Background Art

The art within which this invention arose is the microwave scanning beam art, such as that associated with the international microwave landing system (MLS). In time reference scanning beam systems, such as the MLS, the angular position of the transmitted beam centroid normally is determined by measuring the times that the leading and trailing edges of the beam illuminate the receiver antenna, and calculating the average. These measurements can be contaminated by mainlobe segments or by sidelobes of the transmitted pattern being reflected onto the mainlobe measurement threshold, either from the ground or from some object such as a hangar. This measurement error has an adverse effect on system performance. The inherent nature of the relationship of the direct mainlobe energy and both main and sidelobe reflected energy, is such that in the MLS an early time measurement error in the "TO" scan of a "TO"-"FRO" scan pair, is accompanied by a late time measurement error in the "FRO" scan, and vice-versa. The aircraft receiver decodes the angular position of the beam illuminating the aircraft by the measurement of the time between the "TO" beam passage and the "FRO" beam passage, where the "TO" beam scan sweeps from the start position to the maximum scan angle while the "FRO" beam scan returns the beam to the start position. Thus, the "TO" error adds to the "FRO" error. The resulting additive error can cause undesirable flight path deviations, and undesirable motions of the aircraft control surfaces when the MLS is coupled to the autopilot for aircraft approach and landing.

The current approach to this additive error problem is to reduce the amplitude of the sidelobes relative to the mainlobe. This can be accomplished in a linear phased array antenna by providing preferred amplitude distributions among the radiating elements, or by individual element directivity, or by phasing element groups to provide a sub-array directivity. The amplitude distribution approach degrades both the directivity and gain of the mainlobe. For example, a cosine amplitude taper reduces the first sidelobe level to −23 dB, but increases the beamwidth of the mainlobe by about 37 percent. A cosine-squared taper reduces the first sidelobe level to −31.7 dB, with a beamwidth increase of an intolerable 66 percent. There are other distributions with more desirable pattern characteristics, such as the Dolph-Chebyshev, that "optimizes" the beamwidth for any selected sidelobe level. However, all sidelobe levels are equal for this distribution, which results in a waste of total energy and a corresponding decrease in gain, even for the optimized beamwidth. The Taylor line source, a modification of Dolph-Chebyshev, tapers the sidelobe pattern envelope providing some control over the main-beam gain.

Reducing the sidelobe levels by providing element directivity has theoretical merit, but would require element dimensions that would be unwieldly. Electronically packaging the radiating elements into groups, as described by Hazeltine U.S. Pat. No. 4,041,501, provides the sub-element array that reduces the sidelobe amplitudes. However, that antenna is mechanically quite complex, having long RF paths that could be sensitive to temperature and frequency changes.

DISCLOSURE OF INVENTION

This invention reduces the MLS error caused by radiation reflections into the mainlobe by reducing the effective, rather than the actual, levels of the reflected radiation. The reduction is attained regardless of the characteristics and locations of the reflecting surfaces, and whether the reflections are specular or diffuse. However, for descriptive clarity, the descriptions and drawings will emphasize specular ground reflections in the vertical plane for the MLS elevation (EL) antenna. The same results would be obtained for diffuse reflections from the EL antenna, and for lateral reflections from the MLS azimuth (AZ) antenna.

The essence of this invention is to cause the reflection induced error during the "TO" scan to cancel rather than add to the error induced during the "FRO" scan. This is accomplished by changing the antenna phase center height between scans. This height change alters the path length difference between the direct and reflected signals, from the transmit to the receive antenna. When the path length difference change corresponds to a half wavelength, reflected signals that previously added to, now would subtract from, the direct signal. This causes the reflection induced error in the beam centroid position to move in the same direction during the "TO" and "FRO" scans and thus have no effect on the time difference between the "TO" and "FRO" beam centroids. Thus the phase center height diversity of the EL antenna between scans will cause the "TO" scan error to cancel rather than add to the "FRO" scan error, negating the adverse error inducing effect of the reflection. An alternate approach is to jump the phase center height between scan pairs, and then average the calculated angle of the airborne antenna relative to the average phase center height of the ground antenna.

Figure 2:
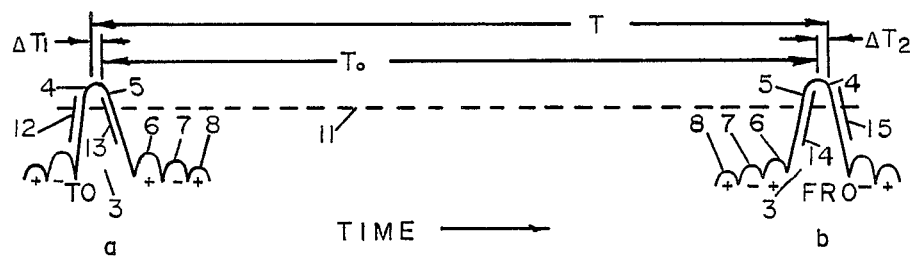
FIG. 2 is a cartesian coordinate view of a scanning beam, that illustrates the source of sidelobe activated error.
Figure 4:
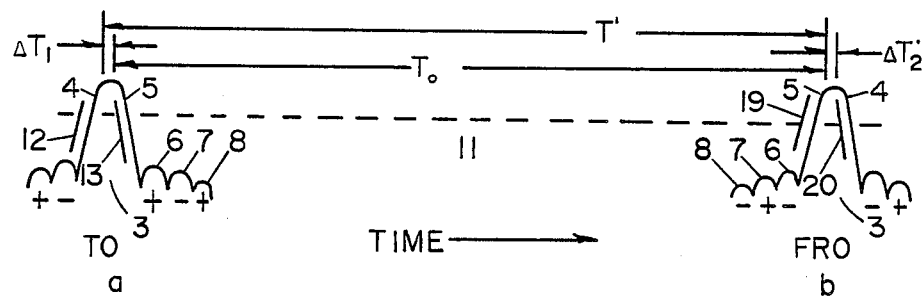
FIG. 4 illustrates the effect of sidelobe phase changes on the effective sidelobe activated error.

It is noted and emphasized that the phases of the sidelobe energy shown by FIGS. 2 and 4, are the phases relative to the mainlobe, when this reflected sidelobe energy arrives at the mainlobe measurement threshold.

Best Mode for Carrying Out the Invention

Figure 1:
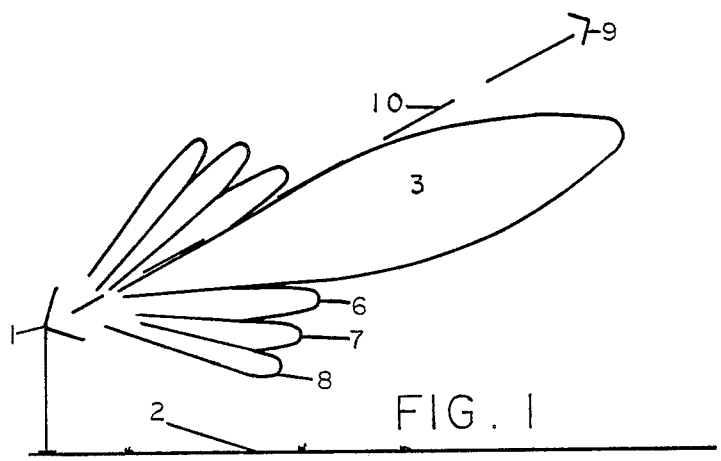
FIG. 1 is a polar coordinate view of a scanning beam.

A vertical cross-section of an antenna pattern radiated by an MLS elevation (EL) antenna is illustrated by FIG. 1, which shows the phase center 1 of the EL antenna over ground plane 2 radiating scanning beam 3 having an upper edge 4 and a lower edge 5, and with sidelobes 6, 7, and 8. It also shows aircraft antenna 9 positioned on glide slope 10. The upper edge 4 is the leading edge of scanning beam 3 during the "TO", or upward scan and the trailing edge during the "FRO", or downward scan. Conversely, the lower edge 5 is the leading edge during the "FRO", or downward, scan and the trailing edge during the "TO", or upward scan. The "TO" and "FRO" scans of the MLS EL antenna are illustrated in cartesian format by FIG. 2. The centroid measurements, to determine the exact time that the midpoint of the scanning beam illuminates the airborne antenna, are made at a nominal level, typically −3 dB, identified as measurement threshold 11 and shown as the dashed line on that figure. When sidelobe energy does not contaminate the mainlobe at its measurement threshold 11, then the time difference at the aircraft antenna 9 between the passage of the "TO" and "FRO" beams is $T_o$, which is a measure of the angular position of the aircraft antenna 9 relative to the phase center 1 of the EL antenna. When the sidelobes of the EL antenna are reflected by ground plane 2 into the measurement threshold 11 of the mainlobe, a distortion of the mainlobe occurs. During the "TO" scan, a time measurement error $\Delta T_1$ ensues, and during the "FRO" scan a time measurement error $\Delta T_2$ occurs. These error are additive, as explained in subsequent paragraphs.

Figure 3:
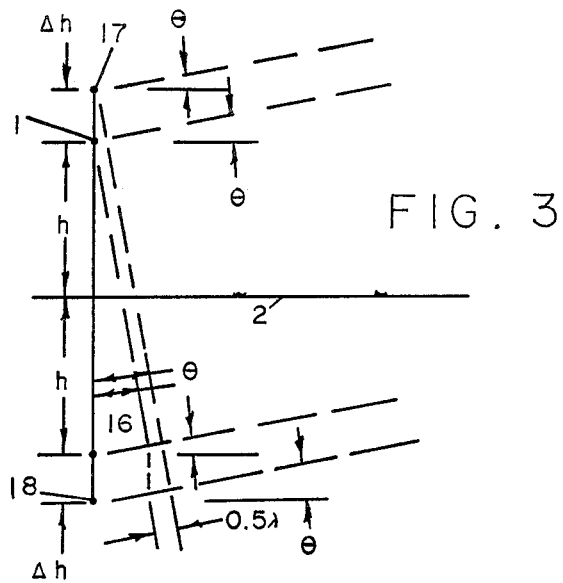
FIG. 3 illustrates the geometry associated with changing the phase of the reflected sidelobe energy.

It is important to note that mathematically the reflections can be treated as signals emanating from an image antenna located below the surface, as will be shown and described when FIG. 3 is discussed. It is also noted that all calculations in this application assume that the phase center 1 of the EL antenna and the airborne antenna 9 are separated by a distance sufficient to geometrically assume that radiation from the real EL antenna and from its image are parallel. If not parallel, the described invention remains valid, but the optimum displacement of the EL antenna phase center 1 from scan-to-scan also becomes a function of range.

Referring again to FIG. 2, the reflection induced errors associated with the "TO" and "FRO" scans are additive for the following reasons: When leading edge 4 of the "TO" scan illuminates aircraft antenna 9 as shown by FIG. 2a, that antenna also will be illuminated by the ground reflected Plus-phase energy from sidelobe 6. Note again that when the radiation is reflected from the ground at near grazing angles, that it undergoes a substantial phase reversal. Thus, a minus-phase sidelobe in free space becomes, upon reflection, a plus-phase contaminant. This resulting plus-phase energy from sidelobe 6 will add vectorially to the mainlobe energy, resulting in an early measurement of its leading edge at measurement threshold 11. When the trailing edge 5 of the "TO" scan reaches the airborne antenna 9, that antenna also will be illuminated by the reflected minus-phase sidelobe 7 which is contiguous to sidelobe 6. The reason that the reflection region moved to the contiguous sidelobe is that the angular distance between corresponding points on contiguous sidelobes is about one beamwidth of the mainlobe at measurement threshold 11. The minus-phase reflected energy from sidelobe 7 subtracts from the mainlobe energy at the trailing edge of the "TO" beam, also resulting in an early measurement. Accordingly, the beam centroid, being defined as half-way between the leading and trailing edge measurements, would have an undetectable negative time error. The term "undetectable error" means the airborne receiver has no method or information to determine that the measurement does not represent true angular position in the ground antenna coordinate system.

Consider now the "FRO" or downscan of the MLS EL scanning beam, as illustrated by FIG. 2b. When the aircraft antenna 9 is illuminated by the leading edge 5, its antenna also is illuminated by the minus phase reflection from sidelobe 7. Note that the mainlobe and sidelobe positions are identical when the aircraft antenna 9 is illuminated by the leading edge 5 of the downscan and the trailing edge 5 of the upscan. The mainlobe and sidelobe positions also are identical when the aircraft antenna 9 is illuminated by the trailing edge 4 of the downscan and the leading edge 4 of the upscan. Thus, the undetectable error in the centroid position measurement during the downscan is a positive time error. The two centroid timing errors, negative for upscan and positive for downscan, result in an undetectable additive time difference error which translates into an undetectable additive angle error.

In order to avoid beam overlap in the transition region between the "TO" and "FRO" scans, a pause time between the scans is provided by the standard signal format.

The essence of this invention is to provide phase reversal of the reflected energy during the "FRO" scan, as compared to the reflected energy during the "TO" scan. This can be accomplished by vertically displacing the phase center of the antenna between scans as illustrated by FIG. 3. The phase center can also be vertically displaced between scan pairs, or among groups of scans, and reflection error effect compensation occurs by receiver averaging or filtering. In its present and normal configuration, the phase center 1 of the EL antenna remains at height h above ground plane 2 for all scans and its image 16 remains at distance h below ground plane 2. The sidelobe energy reflections will either add to or subtract from the mainlobe, depending upon the glideslope angle $\theta$ and phase center height h. Referring to FIG. 3, when the phase center height is raised by an amount $\Delta h$ to position 17, its image will move to image position 18 such that the path length of the reflected signal is changed by 0.5 $\lambda$, where $\lambda$ is the wavelength of the radiation, and there will be a 180 degree reversal of the phase angle of the reflected sidelobes. Total reversal is achieved when $\Delta h = \lambda/(4 \sin\theta)$.

Referring now to FIG. 4a, the "TO" scan occurs with the EL antenna phase center height at h, resulting in the same negative undetectable error as in FIG. 2a. However, during the "FRO" scan, the EL antenna phase center height is raised to $h+\Delta h$ (or lowered to $h-\Delta h$), thus reversing the phase of all reflected sidelobes relative to the mainlobe, as compared to the phase during "TO" scan. Thus it is a plus-phase reflection of sidelobe 7 that contaminates the leading edge 5 of mainlobe 3, and a minus-phase reflection of sidelobe 6 that contaminates its trailing edge. The result, illustrated by FIG. 4b, is a negative undetectable time error in the beam centroid measurement. The total sidelobe activated error thus will be the difference between the "TO" and "FRO" errors, rather than the sum as occurs with the conventional system. The improvement is considerably greater than an order of magnitude, and by proper selection of parameter values could be greater than 30 dB.

It is important to note that the optimum change in phase center height $\Delta h$ is a function only of wavelength λ and glideslope angle θ, and not as a function of phase center height h. Accordingly, in a simple embodiment Δh would be a constant, and selected to accommodate the preferred glideslope angle.

A more advanced embodiment would provide for a Δh as a function of mainlobe pointing angle during either or both the "TO" and "FRO" scans, such that the sidelobe activated errors would be in the cancellation direction at all glideslope angles.

The antenna pattern structure formed by a uniformly illuminated aperture would represent the simplest embodiment of this improvement, since movement of the phase center height would not disturb the amplitude distribution among the antenna elements. While the first sidelobes would be only about 13 dB below mainlobe, these normally do not reflect into the mainlobe. With the illustrated parameter values, only the 4th and higher angle sidelobes could reflect into a 1° beamwidth mainlobe at a 3° glideslope angle. At this angle, it can be calculated from the Δh equation that the Δh required to minimize the effect of sidelobe reflections at C-band is about 1 ft., a convenient value for implementation.

Figure 5:
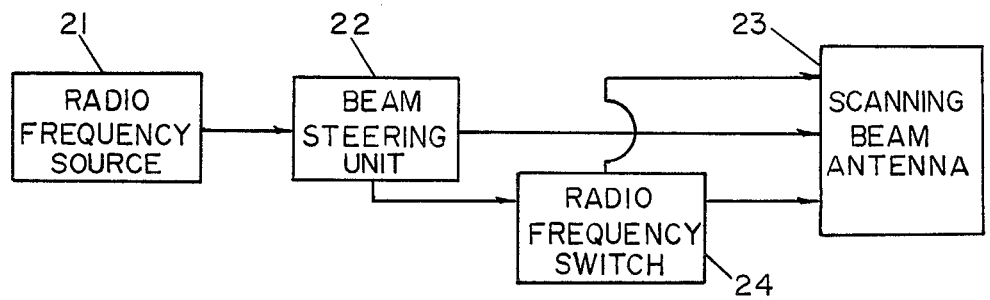
FIG. 5 shows a block diagram of an antenna system incorporating controlled phase center diversity.
Figure 6:
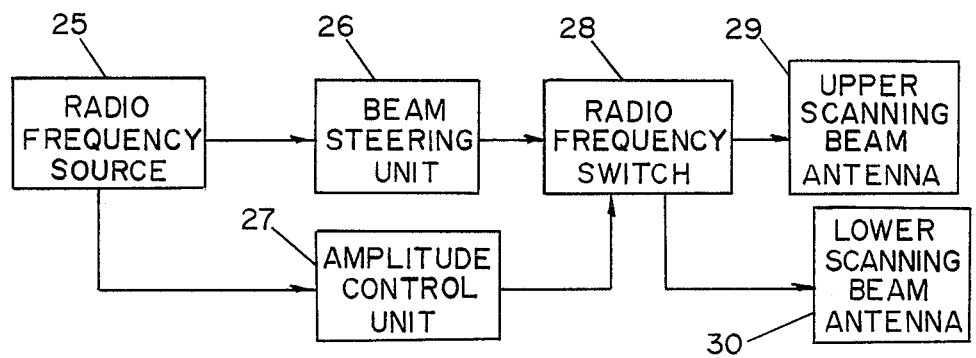
FIG. 6 shows a method for displacing an amplitude distribution.

The block diagram for phase center height diversity with uniform aperture illumination is shown by FIG. 5. A signal generated by radio frequency source 21 provides the input to beam steering unit 22, which generates the phases of the signals that are routed to the radiating elements of antenna 23. The center portion of antenna 23 is driven directly by beam steering unit 22, and the upper and lower portions are driven selectively by routing a portion of the signal through radio frequency switch 24 alternately to the upper and lower segments of antenna 23. The arrangement of components illustrated by FIG. 5 is particularly applicable to radiation patterns formed by a uniform illumination of the antenna 23 aperture, but is applicable with somewhat less efficiency to non-uniform illuminations. In the event that it is desired to provide a lower actual sidelobe level, the scanning beam could be formed by providing a non-uniform amplitude distribution to the radiating elements. Then in order to maintain beam integrity it would be necessary to displace the entire amplitude distribution by the Δh distance, which in its most elementary, but not necessarily its most economical, form would require 2 antennas as illustrated by FIG. 6. This embodiment would combine the advantages of the usual approach to the sidelobe reflection problem, i.e., reducing the relative amplitudes of the sidelobes, plus the advantages associated with the described phase center height diversity. Referring to FIG. 6, the radio frequency source 25 provides an input to a beam steering unit 26, and also to an amplitude control unit 27. The resulting phases and amplitudes of the signal are routed alternately by radio frequency switch 28 to antennas 29 and 30, or onto two different segments of the same antenna which are at different phase center heights above the ground plane.

The configurations thus far described, optimize the measurement process at a particular glideslope angle, for example 3 degrees. However, a more sophisticated version could provide a multiple or continuous phase center diversity program to optimize the phase center heights between "TO" and "FRO" scans as a function of beam pointing angle. This could be accomplished, for example, by providing a multiple position radio frequency switch in box 24 of FIG. 5 or in box 28 of FIG. 6, with each position being connected to an antenna having a different phase center height, or to different phase center height segments of the same antenna.

While this improvement has been described as it applies to sidelobe activated errors to the MLS EL antenna, the technique also is applicable to mainbeam activated errors, and also to the MLS AZ antenna.

Figure 7:
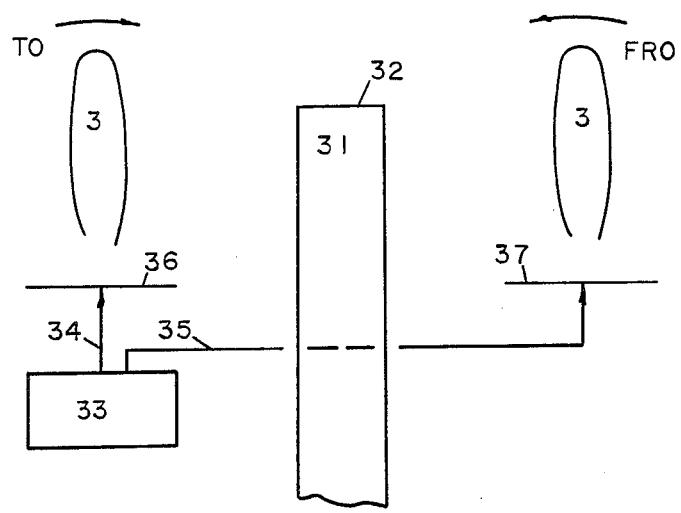
FIG. 7 shows a split-azimuth antenna stradling a runway.

In the azimuth case, the positions of the sidelobe reflectors, e.g., hangars and parked aircraft, are usually not as near the antenna as the elevation case. Nevertheless space diversity in the guidance plane lateral to the runway can produce a sidelobe path length activated phase difference. The magnitude of the phase change is a function of the diversity spacing and the azimuth angle from the antenna to the reflecting surface. The mathematics of the azimuth case are the same as that for the elevation case, rotated 90 degrees. An extension of this phase center diversity concept is the split azimuth configuration, where each side of the runway is provided with "half-an-AZ" station. Referring now to FIG. 7, showing runway 31 with approach threshold 32, and azimuth transmitter 33, which may be a function distributed between the two antenna segments, connected by co-axial cables 34 and 35 to left antenna pattern 36 and right antenna pattern 37 of radiating scanning beam 3. This configuration provides a signal that is essentially transparent to the receiver for some subset of the normal azimuth coverage. The space diversity is now across the runway, there being one azimuth station on each side of the runway, with a "TO" scan by one station and a "FRO" scan by the other station. Alternately, the two half-AZ stations can vectorily join signals to provide an aggregate "TO" and an aggregate "FRO" signal, with the virtual phase center being midway between two separate azimuth antennas.

The methods and techniques herein described also are applicable to scanning beam systems other than the MLS "TO"-"FRO" scan sequence. For example, a related situation occurs when the angle is determined by angle signatures on the beam, e.g., if pulse spacing or amplitude modulated tones were a function of beam angle. In a manner similar to that described with the MLS "TO"-"FRO" beams, the phase center movement will tend to cause error cancellation by averaging successive scans.

Consider also a scanning beam height finder radar, with either skin or beacon return, where the beam shape of the target return signal from which the beam centroid is measured is formed during each scan by the successive amplitudes of the signal returns as measured by the radar receiver. The reflection contaminants on each return will be substantially the same, and will neither add nor cancel. However, the reflections will change in phase when the phase center height of the radar is changed between scans or between transmitted pulses. Thus the average of the reflection induced errors with phase center diversity should be near zero.

Other applications of this invention include vertical phase center diversity of azimuth measuring radars. In this application, diversity, whether scan-to-scan or pulse-to-pulse, will assure detection of a target that normally would be in an undetectable null induced by ground reflection.

Industrial Applicability

This invention has particular and significant applicability in the electronic navigation and landing guidance systems technologies. It provides a capability to obtain accurate measurements of azimuth and elevation angles, even in the presence of a severe multipath environment. The invention nullifies the effects of signal reflections into the measurement regions of the mainlobe, rather than to reduce the magnitudes of these reflections. This approach result in a more compact and more cost-effective multipath resistant antenna, having particular application to time reference scanning beam guidance signals.

We claim:

1. A scanning beam transmit antenna system comprising:
    a source of electromagnetic energy, radiating elements configured as a linear array;
    connecting means for connecting said source to said radiating elements;
    beam steering means to change the phases of the energy emitted by said radiating elements as a function of time to cause sequentially (a) a motion of said scanning beam in the "TO" direction, and (b) a motion of said scanning beam in the "FRO" direction; and
    switching means to interrupt the flow of said electromagnetic energy to said radiating elements at one end of said linear array during the "TO" motion of said scanning beam, and to said radiating elements at the other end of said linear array during the "FRO" motion of said scanning beam, such that the movement of the antenna phase center between a "TO" scan and a "FRO" scan approximates $\Delta h = \lambda/(4 \sin\theta)$, where $\Delta h$ is the change in phase center position, $\lambda$ is the wavelength of the radiation, and $\theta$ is the angle between the direct radiation and the surface that reflects the reflected radiation.

2. A scanning beam transmit antenna system comprising:
    a source of electromagnetic energy,
    radiating elements configured as a linear array;
    connecting means for connecting said source to said radiating elements;
    beam steering means to change the phases of the energy emitted by said radiating elements as a function of time to cause sequentially (a) a motion of said scanning beam in the "TO" direction, and (b) a motion of said scanning beam in the "FRO" direction; and
    switching means to interrupt the flow of said electromagnetic energy to said radiating elements first at one end of said linear array during a first "TO"-"FRO" scan pair motion of said scanning beam, and second at the other end of said linear array during a second "TO"-"FRO" scan pair motion, and cyclicly repeating said first and said second flow interrupt actions, such that the movement of the antenna phase center between each "TO"-FRO" scan pair is approximately $\Delta h = \lambda/(4 \sin\theta)$, where $\Delta h$ is the change in phase center position, $\lambda$ is the wavelength of the radiation, and $\theta$ is the angle between the direct radiation and the surface that reflects the reflected radiation.

3. A scanning beam transmit antenna system comprising:
    a source of electromagnetic energy,
    radiating elements configured as a linear array;
    connecting means for connecting said source to said radiating elements;
    beam steering means to change the phases of the energy emitted by said radiating elements as a function of time to cause sequentially (a) a motion of said scanning beam in the "TO" direction, and (b) a motion of said scanning beam in the "FRO" direction: and
    switching means to selectively interrupt, as a function of beam pointing angle, the flow of said electromagnetic energy to said radiating elements, concurrent with the beam motion activated by said beam steering means, such that the phase center of said linear array moves concurrent with said beam motion, such that the movement of the antenna phase center between scans of a scan pair and/or between scan pairs at corresponding scan angles is approximately $\Delta h = \lambda/(4 \sin\theta)$, where $\Delta h$ is the change in phase center position at each scan angle, $\lambda$ is the wavelength of the radiation, and $\theta$ is the angle between the direct radiation and the surface that reflects the reflected radiation.

4. A scanning beam transmit antenna system as described by claims 1 or 2 or 3 comprising also a programmable power divider for controlling the current distribution of said electromagnetic energy to said radiating elements such that the centroid of said current distribution changes its position between said "TO" scan and said "FRO" scan to maintain a substantially constant radiation pattern of said scanning beam during successive scans.

5. A scanning beam transmit system as described by claims 1 or 2 or 3, comprising also a pause time interval between the ending of the motion of the scanning beam in the "TO" direction, and the commencement of the motion of the scanning beam in the "FRO" direction, during said pause time there being no angular motion of and/or no radiation by said scanning beam.

6. A scanning beam transmit antenna system as described by claims 1 or 2 or 3 wherein said linear array is oriented perpendicular to the ground plane.

7. A scanning beam transmit antenna system as described by claims 1 or 2 or 3 wherein said linear array is oriented parallel to the ground plane.

8. A scanning beam height finder radar antenna system comprising;
    a source of electromagnetic energy;
    an antenna aperture to radiate said electromagnetic energy;
    connection means for connecting said source to said antenna aperture;
    focusing means to concentrate said electromagnetic energy radiated by said antenna aperture into a beam that is narrow in the vertical dimension and broad in the horizontal dimension;
    scanning means to vary the beam pointing angle of said electromagnetic energy as a function of time;
    switching means for selectively interrupting the flow of said electromagnetic energy to segments of said aperture such that the movement of the antenna phase center between scans is approximately $\Delta h = \lambda/(4 \sin\theta)$, where $\Delta h$ is the change in phase center height between scan pairs, $\lambda$ is the wavelength of the radiation, and $\theta$ is the angle between the direct and reflected radiation and the surface that reflects the reflected radiation; and
    receiver means to detect and process electromagnetic energy returned from targets illuminated by said radar antenna.

9. A scanning beam height finder or radar antenna system as described by claim 8, wherein said switching means varies the height of said radar antenna phase center during the interval between the transmission and reception of said electromagnetic energy.

10. A scanning beam height finder radar antenna system as described by claim 8, wherein said switching means varies the height of said radar antenna phase center immediately prior to each transmission of said electromagnetic energy.

11. A scanning beam height finder radar antenna system as described by claim 8 or 4 or 10 wherein said electromagnetic energy is returned from said illuminated target by skin reflections from said target.

12. A scanning beam height finder radar antenna system as described by claims 8 or 9 or 10, wherein said return electromagnetic energy returned from said target is from a beacon transponder responding to an interrogation by said electromagnetic energy transmitted by said height finder radar antenna.

* * * * *